United States Patent
Seiler

(10) Patent No.: US 11,640,699 B2
(45) Date of Patent: May 2, 2023

(54) TEMPORAL APPROXIMATION OF TRILINEAR FILTERING

(71) Applicant: Meta Platforms Technologies, LLC, Menlo Park, CA (US)

(72) Inventor: Larry Seiler, Redmond, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 17/396,036

(22) Filed: Aug. 6, 2021

(65) Prior Publication Data

US 2023/0039787 A1     Feb. 9, 2023

(51) Int. Cl.

| | |
|---|---|
| *G06T 15/04* | (2011.01) |
| *G06T 19/00* | (2011.01) |
| *G06T 15/20* | (2011.01) |
| *G06T 15/00* | (2011.01) |
| *G06V 20/40* | (2022.01) |

(52) U.S. Cl.
CPC .......... *G06T 19/006* (2013.01); *G06T 15/005* (2013.01); *G06T 15/04* (2013.01); *G06T 15/20* (2013.01); *G06V 20/46* (2022.01); *G06T 2200/12* (2013.01); *G06T 2210/36* (2013.01)

(58) Field of Classification Search
None
See application file for complete search history.

(56) References Cited

U.S. PATENT DOCUMENTS

| | | | | |
|---|---|---|---|---|
| 7,372,467 | B1* | 5/2008 | Toksvig | G06T 15/04 345/611 |
| 8,319,789 | B2* | 11/2012 | Koguchi | G06T 15/04 345/589 |
| 2014/0152683 | A1* | 6/2014 | Nystad | G06T 15/04 345/582 |
| 2015/0318019 | A1* | 11/2015 | Singhal | G06V 20/48 386/282 |
| 2016/0078637 | A1* | 3/2016 | Park | G06T 1/60 345/587 |
| 2017/0103565 | A1* | 4/2017 | Jeong | G06T 7/00 |
| 2020/0143516 | A1* | 5/2020 | Martin | G06F 3/012 |
| 2020/0143580 | A1* | 5/2020 | Seiler | G06T 1/60 |
| 2020/0410743 | A1* | 12/2020 | Li | G06T 5/001 |
| 2021/0217220 | A1* | 7/2021 | Kugler | G06T 15/503 |

\* cited by examiner

*Primary Examiner* — Andrew G Yang
(74) *Attorney, Agent, or Firm* — Baker Botts L.L.P.

(57) ABSTRACT

In one embodiment, a method includes receiving instructions to render a snapshot of a scene for a video, where the snapshot is to be displayed using a sequence of N frames, computing a mipmap-level determining factor for a texture appearing in the scene based on a scale of the texture on a pixel grid, selecting a mipmap level of the texture for each of the N frames based on the mipmap-level determining factor, where the mipmap levels selected for the N frames are non-uniform and temporally approximate the mipmap-level determining factor, rendering each of the N frames by sampling the mipmap level of the texture selected for that frame, and displaying the rendered N frames sequentially to represent the snapshot of the scene.

18 Claims, 7 Drawing Sheets

TEMPORAL APPROXIMATION OF TRILINEAR FILTERING

TECHNICAL FIELD

This disclosure generally relates to digital image processing, and in particular, related to temporal anti-aliasing techniques.

BACKGROUND

Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

SUMMARY OF PARTICULAR EMBODIMENTS

Particular embodiments described herein relate to systems and methods for mitigating aliasing artifacts by performing a bilinear filtering using per-frame mipmap levels within a sequence of N frames. A first mipmap level for a first frame within the sequence of N frames may be different from a second mipmap level for a second frame within the sequence of N frames. Displaying an anisotropically-warped image on a digital display may cause noticeable aliasing artifacts, especially when a scale ratio between the image and the display is large. The artifacts may begin noticeable from a two-times anisotropic warping. Although a trilinear filtering may smooth out those artifacts, the trilinear filtering may require twice as many filter computations, which result in significantly more power consumption. When a scale of the rendered pixels and the digital display changes significantly, the rendering system may need more than one mipmap level to filter a surface without producing aliasing artifacts. The surface refers to a rendered array of texels that need to be filtered to generate a final display image. A temporal trilinear filtering disclosed in this application utilizes a sequence of N frame-specific bias values corresponding to the sequence of N frames to select a mipmap level for each frame. Unlike other temporal anti-aliasing techniques such as Temporal Anti-Aliasing (TXAA), the temporal trilinear filtering disclosed herein does not require buffering previous frames.

In particular embodiments, a computing device may receive instructions to render a snapshot of a scene for a video. The snapshot may be to be displayed using a sequence of N frames. For a texture appearing in the scene, the computing device may pre-calculate mipmaps of the texture that comprise a plurality of mipmap levels. Each mipmap level may comprise a rendered array of texels that need to be filtered to determine a color value for each pixel in the pixel grid. In particular embodiments, a rendered array of texels at mipmap level k may be a power of two smaller than a rendered array of texels at mipmap level k-1. To sample a mipmap level of the texture, the computing device may perform a bilinear texture filtering at the mipmap level of the texture. In particular embodiments, the bilinear texture filtering at the mipmap level of the texture may comprise sampling four nearest texels in the mipmap level for a pixel center. A color value for the pixel center may be determined by weighted average of the four nearest texels according to their distances to the pixel center. The computing device may compute a mipmap-level determining factor for a texture appearing in the scene based on a scale of the texture on a pixel grid. In particular embodiments, the scale of the texture on the pixel grid in each direction may be computed as a Manhattan distance. The scale in U direction is computed as $|dx/du|+|dy/du|$, where x is a horizontal axis of the pixel grid, and where y is a vertical axis of the pixel grid. The scale in V direction may be computed as $|dx/dv|+|dy/dv|$. The mipmap-level determining factor for the texture appearing in the scene may be computed as $\max(0, \log_2(\max(\text{scale in U direction}, \text{scale in V direction}))+\text{MipBias}$, wherein the MipBias is determined based on an amount of desired blur. The computing device may select a mipmap level of the texture based on the mipmap-level determining factor for each of the N frames. The mipmap levels selected for the N frames may be non-uniform and temporally approximate the mipmap-level determining factor.

The computing device may select the mipmap level of the texture further based on a frame-specific factor. In particular embodiments, the frame-specific factor may be determined based on a position of the frame within the sequence of N frames. In particular embodiments, the position of the frame within the sequence of N frames may be determined by taking a modulo operation on a global frame sequence number corresponding to the frame with N. The frame-specific factor within the sequence of N frames may be distributed around zero within a range between −0.5 to +0.5. The computing device may render each of the N frames by sampling the mipmap level of the texture selected for that frame. The computing device may display the rendered N frames sequentially to represent the snapshot of the scene. The computing device may pre-determine N, a number of frames used for displaying the snapshot, that avoids any potential flickering.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1A:
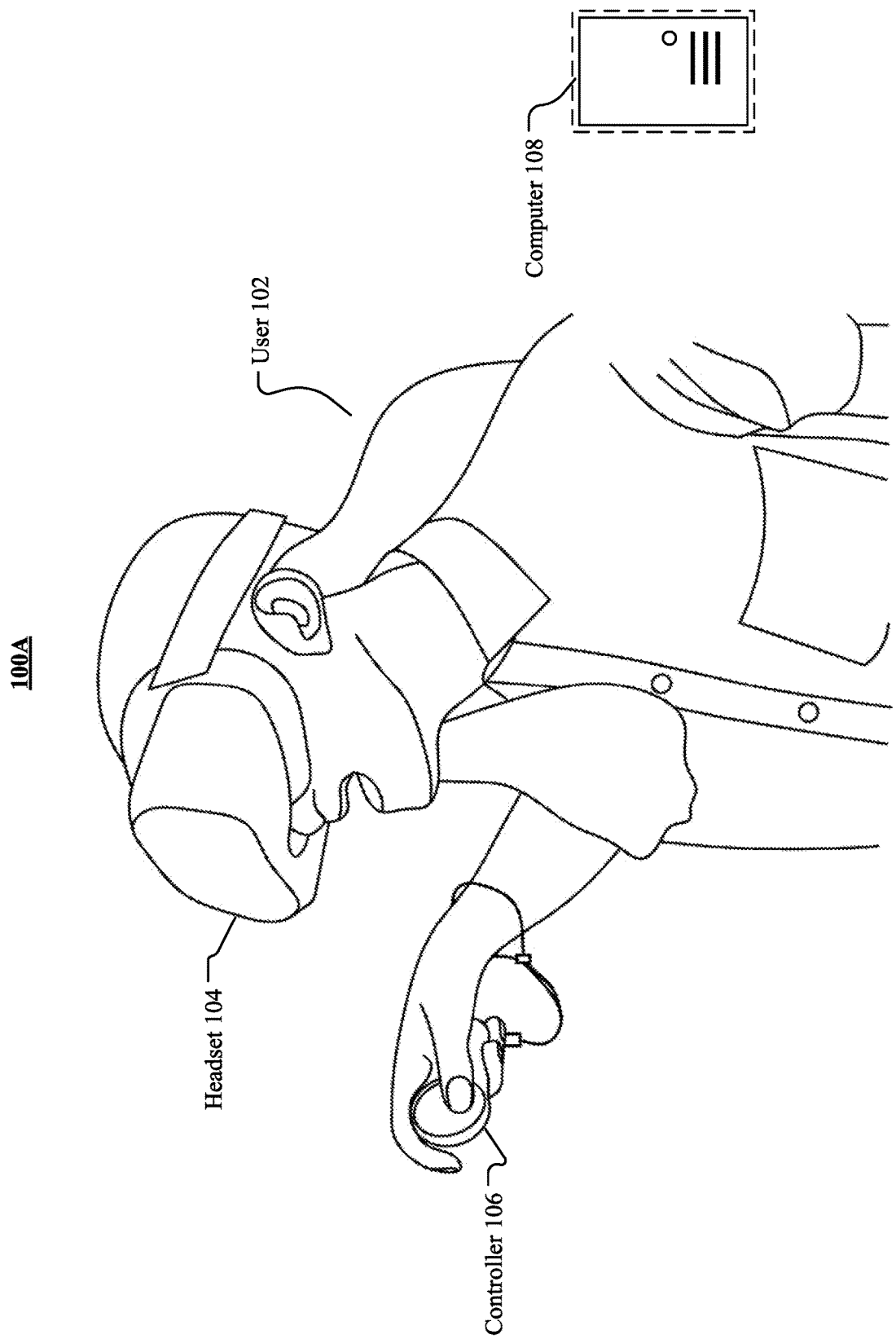
FIG. 1A illustrates an example artificial reality system.

FIG. 1A illustrates an example artificial reality system 100A. In particular embodiments, the artificial reality system 100A may comprise a headset 104, a controller 106, and a computing device 108. A user 102 may wear the headset 104 that may display visual artificial reality content to the user 102. The headset 104 may include an audio device that may provide audio artificial reality content to the user 102. The headset 104 may include one or more cameras which can capture images and videos of environments. The headset 104 may include an eye tracking system to determine the vergence distance of the user 102. The headset 104 may include a microphone to capture voice input from the user 102. The headset 104 may be referred as a head-mounted display (HMD). The controller 106 may comprise a trackpad and one or more buttons. The controller 106 may receive inputs from the user 102 and relay the inputs to the computing device 108. The controller 106 may also provide haptic feedback to the user 102. The computing device 108 may be connected to the headset 104 and the controller 106 through cables or wireless connections. The computing device 108 may control the headset 104 and the controller 106 to provide the artificial reality content to and receive inputs from the user 102. The computing device 108 may be a standalone host computing device, an on-board computing device integrated with the headset 104, a mobile device, or any other hardware platform capable of providing artificial reality content to and receiving inputs from the user 102.

Figure 1B:
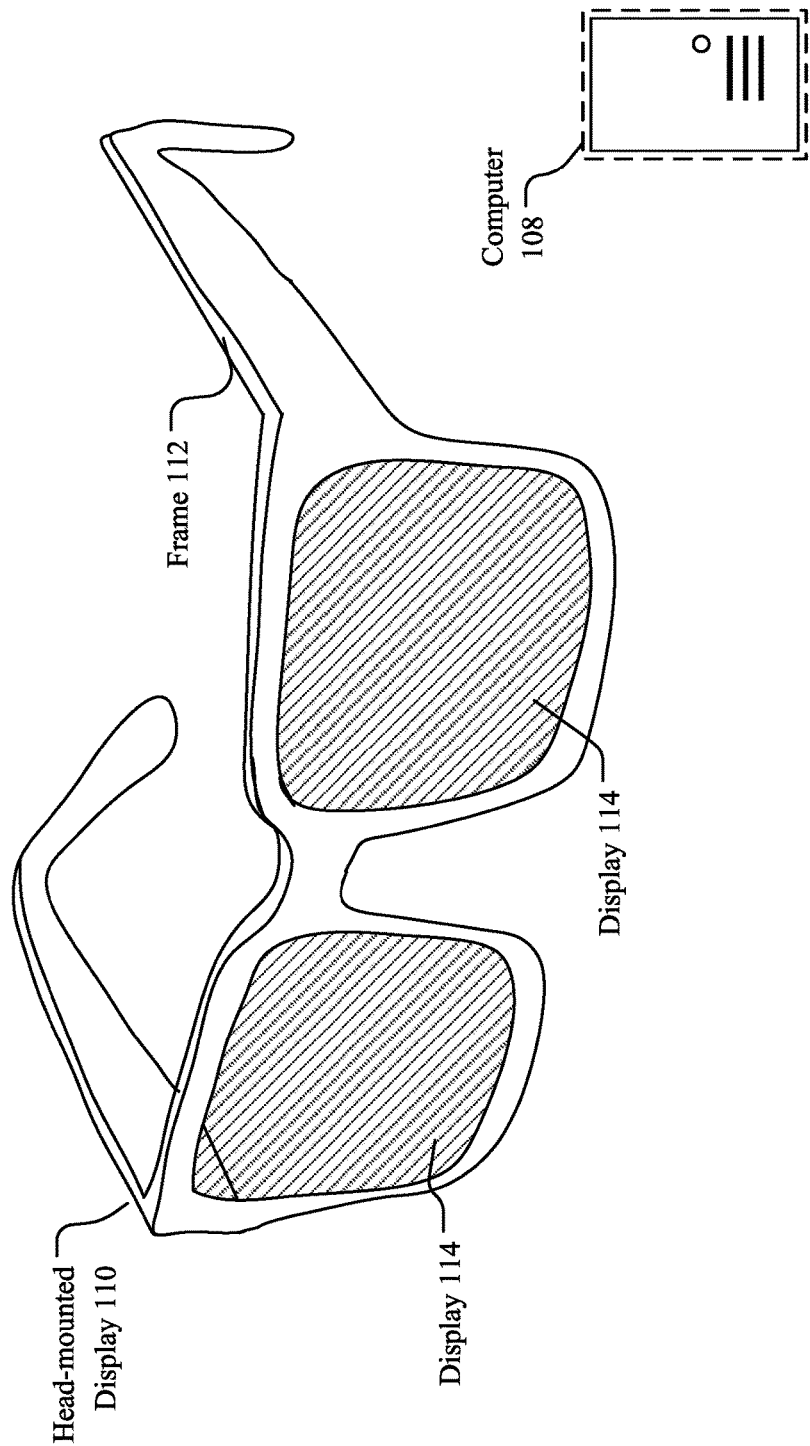
FIG. 1B illustrates an example augmented reality system.

FIG. 1B illustrates an example augmented reality system 100B. The augmented reality system 100B may include a head-mounted display (HMD) 110 (e.g., glasses) comprising a frame 112, one or more displays 114, and a computing device 108. The displays 114 may be transparent or translucent allowing a user wearing the HMD 110 to look through the displays 114 to see the real world and displaying visual artificial reality content to the user at the same time. The HMD 110 may include an audio device that may provide audio artificial reality content to users. The HMD 110 may include one or more cameras which can capture images and videos of environments. The HMD 110 may include an eye tracking system to track the vergence movement of the user wearing the HMD 110. The HMD 110 may include a microphone to capture voice input from the user. The augmented reality system 100B may further include a controller comprising a trackpad and one or more buttons. The controller may receive inputs from users and relay the inputs to the computing device 108. The controller may also provide haptic feedback to users. The computing device 108 may be connected to the HMD 110 and the controller through cables or wireless connections. The computing device 108 may control the HMD 110 and the controller to provide the augmented reality content to and receive inputs from users. The computing device 108 may be a standalone host computer device, an on-board computer device integrated with the HMD 110, a mobile device, or any other hardware platform capable of providing artificial reality content to and receiving inputs from users.

In particular embodiments, a computing device 108 may receive instructions to render a snapshot of a scene for a video. The snapshot may be to be displayed using a sequence of N frames. For a texture appearing in the scene, the computing device 108 may pre-calculate mipmaps of the texture that comprise a plurality of mipmap levels. Each mipmap level may comprise a rendered array of texels that need to be filtered to determine a color value for each pixel in the pixel grid. In particular embodiments, a rendered array of texels at mipmap level k may be a power of two smaller than a rendered array of texels at mipmap level k-1. To sample a mipmap level of the texture, the computing device 108 may perform a bilinear texture filtering at the mipmap level of the texture. In particular embodiments, the bilinear texture filtering at the mipmap level of the texture may comprise sampling four nearest texels in the mipmap level for a pixel center. A color value for the pixel center may be determined by weighted average of the four nearest texels according to their distances to the pixel center. The computing device 108 may compute a mipmap-level determining factor for a texture appearing in the scene based on a scale of the texture on a pixel grid. In particular embodiments, the scale of the texture on the pixel grid in each direction may be computed as a Manhattan distance. The scale in U direction is computed as ldx/du|+|dy/du|, where x is a horizontal axis of the pixel grid, and where y is a vertical axis of the pixel grid. The scale in V direction may be computed as ldx/dv|+|dy/dv|. The mipmap-level determining factor for the texture appearing in the scene may be computed as max(0, $\log_2$(max(scale in U direction, scale in V direction))+MipBias, wherein the MipBias is determined based on an amount of desired blur. The computing device 108 may select a mipmap level of the texture based on the mipmap-level determining factor for each of the N frames. The mipmap levels selected for the N frames may be non-uniform and temporally approximate the mipmap-level determining factor. The computing device 108 may select the mipmap level of the texture further based on a frame-specific factor. In particular embodiments, the frame-specific factor may be determined based on a position of the frame within the sequence of N frames. In particular embodiments, the position of the frame within the sequence of N frames may be determined by taking a modulo operation on a global frame sequence number corresponding to the frame with N. The frame-specific factor within the sequence of N frames may be distributed around zero within a range between −0.5 to +0.5. The computing device 108 may render each of the N frames by sampling the mipmap level of the texture selected for that frame. The computing device 108 may display the rendered N frames sequentially to represent the snapshot of the scene. The computing device 108 may pre-determine N, a number of frames used for displaying the snapshot, that avoids any potential flickering. Although this disclosure describes performing a temporal approximation of trilinear filtering by performing a bilinear filtering at a frame-specific mipmap level for each frame in a particular manner, this disclosure contemplates performing a temporal approximation of trilinear filtering by performing a bilinear filtering at a frame-specific mipmap level for each frame in any suitable manner.

In particular embodiments, the computing device 108 may receive instructions to render a snapshot of a scene for a video. In particular embodiments, the scene may comprise a plurality of virtual objects. The snapshot may be to be displayed using a sequence of N frames. As an example and not by way of limitation, a user may be playing a VR game using the headset 104. The computing device 108 may receive instructions to present scenes to the headset 104, where the scenes comprise a plurality of virtual objects. A rendered virtual object among the plurality of virtual objects may be used for being displayed on the headset 104 for a plural number of frames until the virtual object is re-rendered. As another example and not by way of limitation, a user may be using an augmented-reality application on the HMD 110. The computing device 108 may receive instructions to present scenes to the display 114, where the scenes comprise at least one or more virtual objects. A rendered virtual object among the at least one or more virtual objects may be used for being displayed on the display 114. Although this disclosure describes receiving instructions to render a snapshot of a scene comprising virtual objects in a particular manner, this disclosure contemplates receiving instructions to render a snapshot of a scene comprising virtual objects in any suitable manner.

Figure 2:
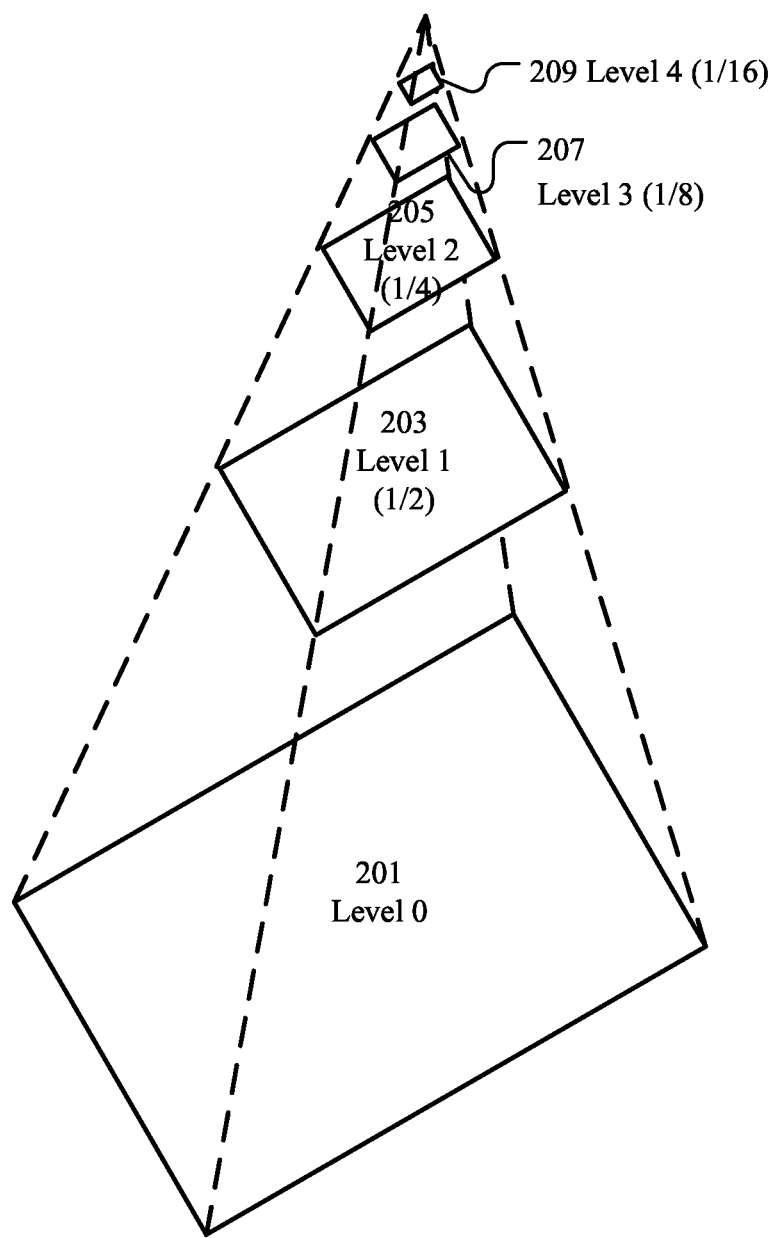
FIG. 2 illustrates example mipmaps for a texture.

In particular embodiments, the computing device 108 may, for each texture for a rendered object appearing in the scene, pre-calculate mipmaps of the texture that comprise a plurality of mipmap levels. Each mipmap level may comprise a rendered array of texels that need to be filtered to determine a color value for each pixel in the pixel grid. In particular embodiments, a rendered array of texels at mipmap level k may be a power of two smaller than a rendered array of texels at mipmap level k-1. FIG. 2 illustrates example mipmaps for a texture. As an example and not by way of limitation, illustrated in FIG. 2, the computing device 108 may access an original image 201 for a texture of a rendered object. The original image 201 may be a level 0 of the mipmaps. The computing device 108 may generate a level 1 image 203 by subsampling the original image 201. The width and height of the level 1 image 203 may be ½ of those of the original image 201. The computing device 108 may generate a level 2 image 205 by subsampling the level 1 image 203. The width and height of the level 2 image 205 may be ¼ of those of the original image 201. The computing device 108 may generate a level 3 image 207 by subsampling the level 2 image 205. The width and height of the level 3 image may be ⅛ of those of the original image 201. The computing device 108 may generate a level 4 image 209 by subsampling the level 3 image 207. The width and height of the level 4 image may be 1/16 of those of the original image 201. Although the mipmaps illustrated in FIG. 2 comprise five levels, the computing device 108 may generate mipmaps of any number of levels. Although this disclosure describes generating mipmaps of a texture of a rendered object in a particular manner, this disclosure contemplates generating mipmaps of a texture of a rendered object in any suitable manner.

Figure 3B:
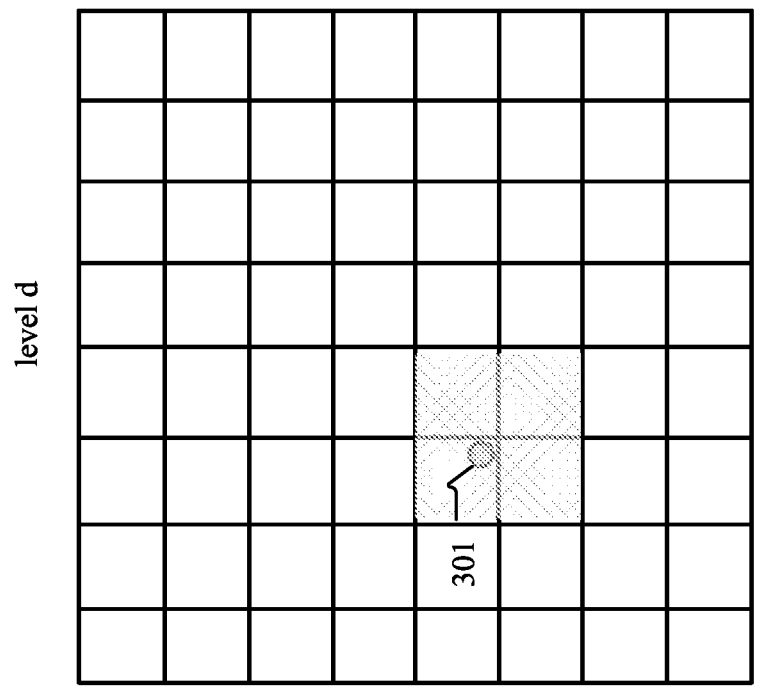
FIGS. 3A-3B illustrate example bilinear texture filtering at different mipmap levels.
Figure 3A:
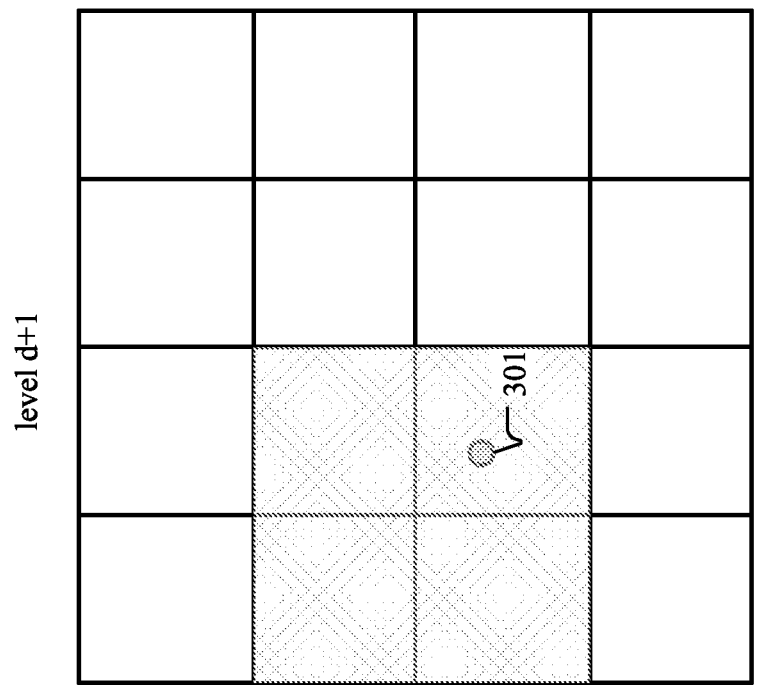

In particular embodiments, the computing device 108 may, to sample a mipmap level of the texture, perform a bilinear texture filtering at the mipmap level of the texture. In particular embodiments, the bilinear texture filtering at the mipmap level of the texture may comprise sampling four nearest texels in the mipmap level for a pixel center. A color value for the pixel center may be determined by a weighted average of the four nearest texels according to their distances to the pixel center. FIGS. 3A-3B illustrate example bilinear texture filtering at different mipmap levels. As an example and not by way of limitation, the computing device 108 may determine a mipmap level of the texture to sample. In an example illustrated in FIG. 3A, the computing device 108 determines a mipmap level d+1 to sample. For a pixel center 301 in the pixel grid, the computing device 108 may select four nearest texels in the mipmap level d+1 image, which are shaded in FIG. 3A. The computing device 108 may determine a color value for the pixel center 301 by performing a bilinear interpolation based on distances between the pixel center 301 and centers of the selected four nearest texels, in which a weighted average of the selected four nearest texels is calculated as the color value for the pixel center 301. In an example illustrated in FIG. 3B, the computing device 108 determine a mipmap level d to sample. The width and height of the mipmap level d image may be two times larger than those of the mipmap level d+1 image. For a pixel center 301 in the pixel grid, the computing device 108 may select four nearest texels in the mipmap level d image, which are shaded in FIG. 3B. The computing device 108 may determine a color value for the pixel center 301 by performing a bilinear interpolation based on distances between the pixel center 301 and centers of the selected four nearest texels, in which a weighted average of the selected four nearest texels is calculated as the color value for the pixel center 301. Although this disclosure describes determining a color value for a pixel by sample a mipmap level image of the texture in a particular manner, this disclosure contemplates determining a color value for a pixel by sample a mipmap level image of the texture in any suitable manner.

Displaying an anisotropically-warped image on a digital display may cause noticeable aliasing artifacts, especially when a scale between the image and the display changes significantly. The aliasing artifacts may begin noticeable from a two-times anisotropic warping. An example of aliasing artifacts may be the moire pattern. Trilinear filtering is an extension of the bilinear filtering. Trilinear filtering also performs linear interpolation between mipmaps. Although a trilinear filtering may smooth out those artifacts, the trilinear filtering may require twice as many filter computations, which result in significantly more power consumption. When a scale of the rendered pixels and the digital display changes significantly, the rendering system may need more than one mipmap levels to filter a surface without producing aliasing artifacts. A temporal trilinear filtering disclosed in this application utilizes a sequence of N frame-specific bias values corresponding to the sequence of N frames to select a mipmap level for each frame. Unlike other temporal anti-aliasing techniques such as Temporal Anti-Aliasing (TXAA), the temporal trilinear filtering disclosed herein does not require buffering previous frames.

In particular embodiments, the computing device 108 may compute a mipmap-level determining factor for a texture appearing in the scene based on a scale of the texture on a pixel grid. In particular embodiments, the scale of the texture on the pixel grid in each direction may be computed as a Manhattan distance. The scale in U direction is computed as ldx/dul+ldy/dul, where x is a horizontal axis of the pixel grid, and where y is a vertical axis of the pixel grid. The scale in V direction may be computed as ldx/dvl+ldy/dvl. The mipmap-level determining factor for the texture appearing in the scene may be computed as max(0, $\log_2$ (max(scale in U direction, scale in V direction))+MipBias), wherein the MipBias is determined based on an amount of desired blur. In particular embodiments, the MipBias may be zero. As an example and not by way of limitation, the texel grid and pixel grid are aligned, and pixels are two texels apart. Then, ldx/du1=ldy/dv1=2 and ldx/dv1=ldy/du1=0. Therefore, the mipmap-level determining factor would be $\log_2(2)=1$ if the MipBias=0. In this example, the computing device 108 may sample the mipmap level 1 image to determine color values for the pixels in the pixel grid. As another example and not by way of limitation, pixels are one texel apart, but the pixel grid is at 45 degree rotated from the texel grid. We also assume that the MipBias=0. Then the scale in U direction=the scale in V direction=sqrt(2). Thus the mipmap-level determining factor would be $\log_2(\text{sqrt}(2))$ =0.5. Although this disclosure describes computing a mipmap-level determining factor for a texture appearing in the scene in a particular manner, this disclosure contemplates computing a mipmap-level determining factor for a texture appearing in the scene in any suitable manner.

In particular embodiments, the computing device 108 may select a mipmap level of the texture based on the mipmap-level determining factor for each of the N frames. The mipmap levels selected for the N frames may be non-uniform and temporally approximate the mipmap-level determining factor. As an example and not by way of limitation, after computing the mipmap-level determining factor for a texture, the computing device 108 may select a mipmap level of the texture for each of the N frames based on the computed mipmap-level determining factor. In particular embodiments, a first mipmap level selected for a first frame among the N frames may be different from a second mipmap level selected for a second frame among the N frames.

Although this disclosure describes selecting a mipmap level of the texture for each of the N frames in a particular manner, this disclosure contemplates selecting a mipmap level of the texture for each of the N frames in any suitable manner.

Figure 4A:
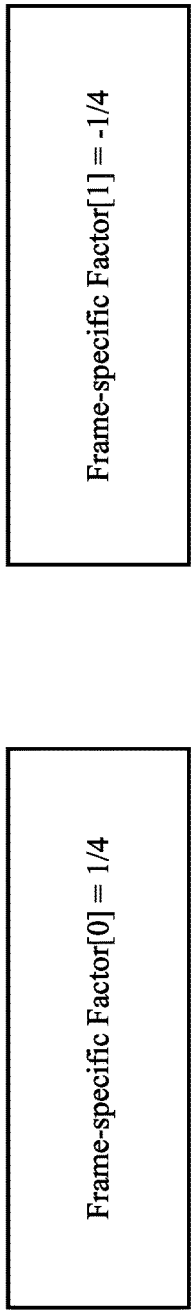
FIGS. 4A-4C illustrate example frame-specific factors.
Figure 4B:
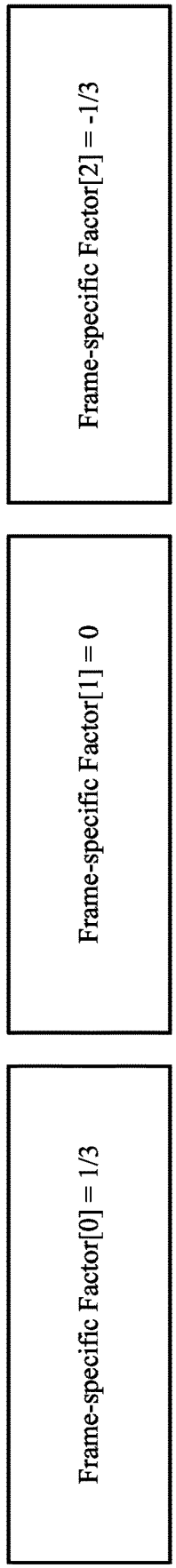
Figure 4C:
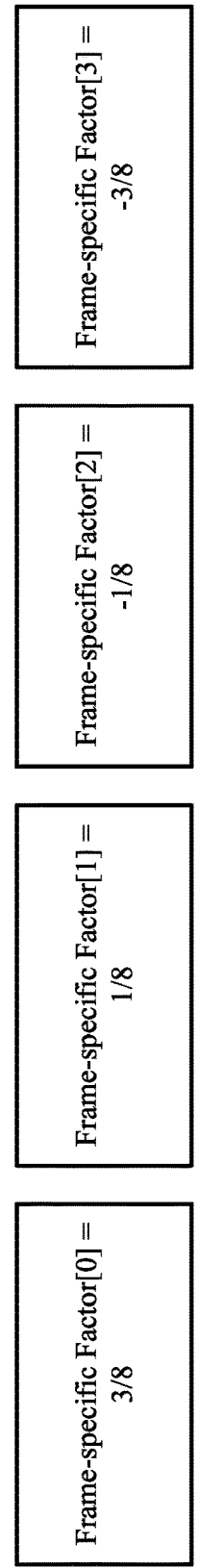

In particular embodiments, the computing device 108 may select the mipmap level of the texture further based on a frame-specific factor. In particular embodiments, the frame-specific factor may be determined based on a position of the frame within the sequence of N frames. In particular embodiments, the position of the frame within the sequence of N frames may be determined by taking a modulo operation on a global frame sequence number corresponding to the frame with N. The frame-specific factor within the sequence of N frames may be distributed around zero within a range between −0.5 to +0.5. FIGS. 4A-4C illustrate example frame-specific factors. As an example and not by way of limitation, the computing device 108 may calculate round (mipmap level determining factor+frame specific factor[i]) to select a mipmap level for i-th frame within a sequence of N frames. FIG. 4A illustrates an example frame-specific factors when N=2. A first frame-specific factor for a first frame in the two-frame cycle is ¼, and a second frame-specific factor for a second frame in the two-frame cycle is −¼. In this example, the computing device 108 has determined that a computed mipmap-level determining factor for a texture is 1.7. The computing device 108 determines a mipmap level for the texture for each frame within the two-frame cycle. For the first frame, the selected mipmap level for the texture is round(1.7+0.25)=2. For the second frame, the selected mipmap level for the texture is round(1.7−0.25)=1. FIG. 4B illustrates an example frame-specific factors when N=3. A first frame-specific factor for a first frame in the three-frame cycle is ⅓, a second frame-specific factor for a second frame in the three-frame cycle is 0, and a third frame-specific factor for a third frame in the three-frame cycle is −⅓. The computing device 108 has also determined that a computed mipmap-level determining factor for a texture is 1.7. The computing device 108 determines a mipmap level for the texture for each frame within the three-frame cycle. For the first frame, the selected mipmap level for the texture is round(1.7+⅓)=2. For the second frame, the selected mipmap level for the texture is round(1.7+0)=2. For the third frame, the selected mipmap level for the texture is round(1.7−⅓)=1. FIG. 4C illustrates an example frame-specific factors when N=4. A first frame-specific factor for a first frame in the four-frame cycle is ⅜, a second frame-specific factor for a second frame in the four-frame cycle is ⅛, a third frame-specific factor for a third frame in the four-frame cycle is −⅛, and a fourth frame-specific factor for a fourth frame in the four-frame cycle is −⅜. The computing device 108 has also determined that a computed mipmap-level determining factor for a texture is 1.7. The computing device 108 determines a mipmap level for the texture for each frame within the four-frame cycle. For the first frame, the selected mipmap level for the texture is round(1.7+⅜)=2. For the second frame, the selected mipmap level for the texture is round (1.7+⅛)=2. For the third frame, the selected mipmap level for the texture is round(1.7−⅛)=2. For the fourth frame, the selected mipmap level for the texture is round(1.7−⅜)=1. Although this disclosure describes selecting a mipmap level of the texture for a frame based on a mipmap-level determining factor and a frame-specific factor in a particular manner, this disclosure contemplates selecting a mipmap level of the texture for a frame based on a mipmap-level determining factor and a frame-specific factor in any suitable manner.

In particular embodiments, the computing device 108 may render each of the N frames by sampling the mipmap level of the texture selected for that frame. As an example and not by way of limitation, continuing with a prior example illustrated in FIG. 4A, the computing device 108 may render the first frame of the two-frame cycle with color values for the pixels in the pixel grid determined by sampling the mipmap level 2 image of the texture. The computing device 108 may render the second frame of the two-frame cycle with color values for the pixels in the pixel grid determined by sampling the mipmap level 1 image of the texture. As another example and not by way of limitation, continuing with a prior example illustrated in FIG. 4B, the computing device 108 may render the first frame of the three-frame cycle with color values for the pixels in the pixel grid determined by sampling the mipmap level 2 image of the texture. The computing device 108 may render the second frame of the three-frame cycle with color values for the pixels in the pixel grid determined by sampling the mipmap level 2 image of the texture. The computing device 108 may render the third frame of the three-frame cycle with color values for the pixels in the pixel grid determined by sampling the mipmap level 1 image of the texture. As yet another example and not by way of limitation, continuing with a prior example illustrated in FIG. 4C, the computing device 108 may render the first frame of the four-frame cycle with color values for the pixels in the pixel grid determined by sampling the mipmap level 2 image of the texture. The computing device 108 may render the second frame of the four-frame cycle with color values for the pixels in the pixel grid determined by sampling the mipmap level 2 image of the texture. The computing device 108 may render the third frame of the four-frame cycle with color values for the pixels in the pixel grid determined by sampling the mipmap level 2 image of the texture. The computing device 108 may render the fourth frame of the four-frame cycle with color values for the pixels in the pixel grid determined by sampling the mipmap level 1 image of the texture. Although this disclosure describes rendering each of the N frames by sampling the mipmap level of the texture selected for that frame in a particular manner, this disclosure contemplates rendering each of the N frames by sampling the mipmap level of the texture selected for that frame in any suitable manner.

The computing device 108 may display the rendered N frames sequentially to represent the snapshot of the scene. The computing device 108 may pre-determine N, a number of frames used for displaying the snapshot, that avoids any potential flickering. In general, using a larger number of frames to display the snapshot may result less flickering than using a smaller number of frames to display the snapshot. Although this disclosure describes displaying the rendered N frames sequentially to represent the snapshot of the scene in a particular manner, this disclosure contemplates displaying the rendered N frames sequentially to represent the snapshot of the scene in any suitable manner.

Figure 5:
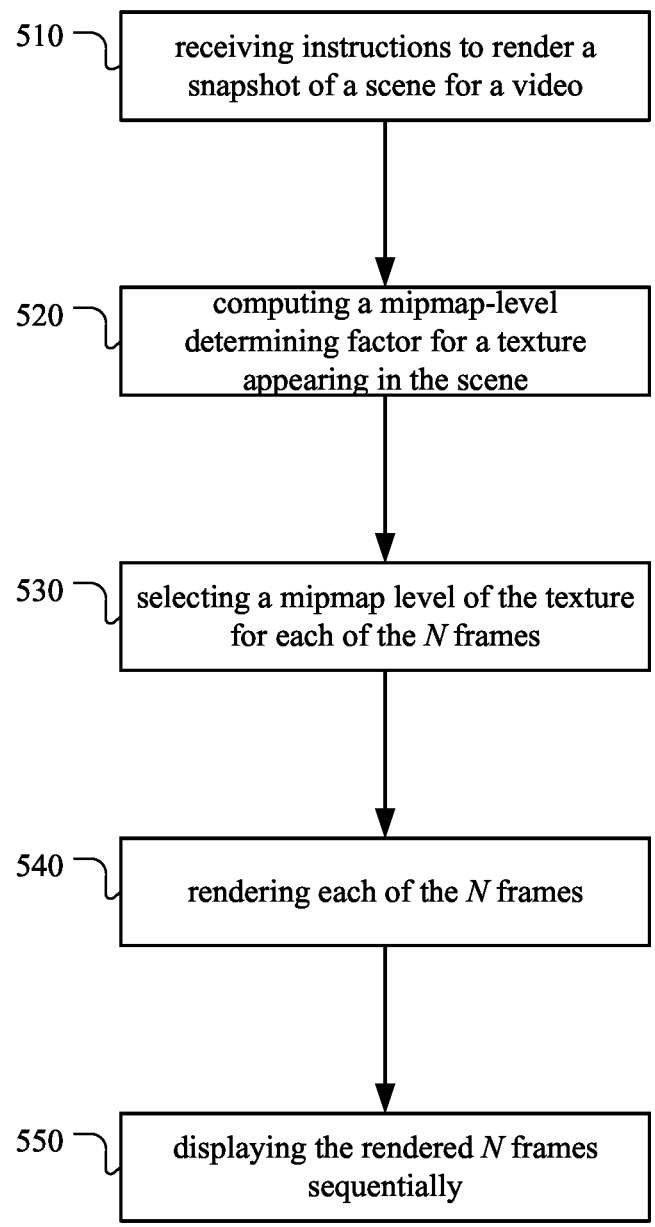
FIG. 5 illustrates an example method for mitigating aliasing artifacts by sampling a per-frame mipmap level image of the texture for each frame within a sequence of N frames.

FIG. 5 illustrates an example method 500 for mitigating aliasing artifacts by sampling a per-frame mipmap level image of the texture for each frame within a sequence of N frames. The method may begin at step 510, where the computing device 108 may receive instructions to render a snapshot of a scene for a video. The snapshot is to be displayed using a sequence of N frames. At step 520, the computing device 108 may compute a mipmap-level determining factor for a texture appearing in the scene based on a scale of the texture on a pixel grid. At step 530, the computing device 108 may select a mipmap level of the texture for each of the N frames based on the mipmap-level determining factor. The mipmap levels selected for the N frames are non-uniform and temporally approximate the mipmap-level determining factor. At step 540, the computing device 108 may render each of the N frames by sampling the mipmap level of the texture selected for that frame. At step 550, the computing device 108 may display the rendered N frames sequentially to represent the snapshot of the scene. Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method for mitigating aliasing artifacts by sampling a per-frame mipmap level image of the texture for each frame within a sequence of N frames including the particular steps of the method of FIG. 5, this disclosure contemplates any suitable method for mitigating aliasing artifacts by sampling a per-frame mipmap level image of the texture for each frame within a sequence of N frames including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Systems and Methods

Figure 6:
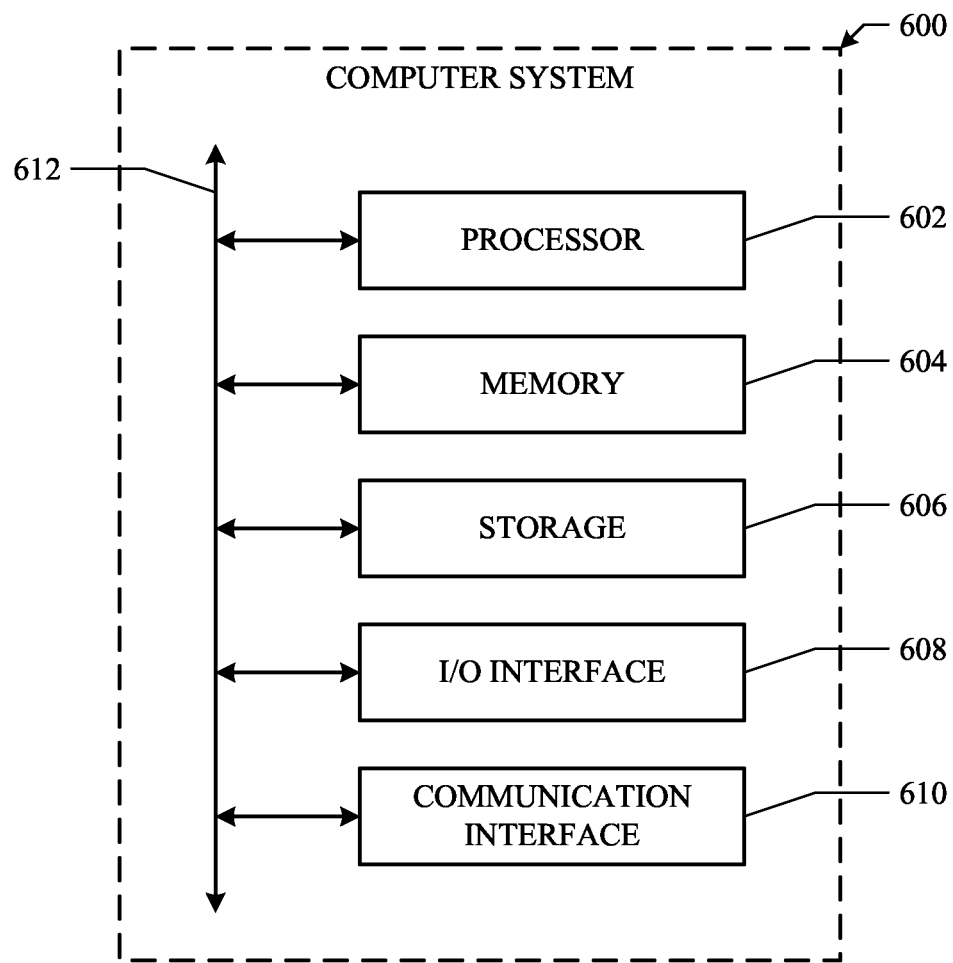
FIG. 6 illustrates an example computer system.

FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600. Herein, reference to a computer system may encompass a computing device, and vice versa, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, tracball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing device:
receiving instructions to render a snapshot of a scene for a video, wherein the snapshot is to be displayed using a sequence of N frames;
computing, for a texture appearing in the scene, a mipmap-level determining factor based on a scale of the texture on a pixel grid;
selecting, for each of the N frames, a mipmap level of the texture based on the mipmap-level determining factor and a frame-specific factor repeating at every N frames in the video, wherein the mipmap levels selected for the N frames are non-uniform and temporally approximate the mipmap-level determining factor;
rendering each of the N frames by sampling the mipmap level of the texture selected for that frame; and
displaying the rendered N frames sequentially to represent the snapshot of the scene.

2. The method of claim 1, wherein the frame-specific factor is determined based on a position of the frame within the sequence of N frames.

3. The method of claim 2, wherein the position of the frame within the sequence of N frames is determined by taking a modulo operation on a global frame sequence number corresponding to the frame with N.

4. The method of claim 1, wherein the frame-specific factor within the sequence of N frames are distributed around zero within a range between −0.5 to +0.5.

5. The method of claim 1, where mipmaps of the texture comprise a plurality of mipmap levels, wherein each mipmap level comprises a rendered array of texels that need to be filtered to determine a color value for each pixel in the pixel grid.

6. The method of claim 5, wherein a rendered array of texels at mipmap level k is a power of two smaller than a rendered array of texels at mipmap level k-1.

7. The method of claim 5, wherein sampling the mipmap level of the texture comprises performing a bilinear texture filtering at the mipmap level of the texture.

8. The method of claim 7, wherein the bilinear texture filtering at the mipmap level of the texture comprises sampling four nearest texels in the mipmap level for a pixel center, wherein a color value for the pixel center is determined by weighted average of the four nearest texels according to their distances to the pixel center.

9. The method of claim 1, wherein the scale of the texture on the pixel grid in each direction is computed as a Manhattan distance.

10. The method of claim 9, wherein the scale in U direction is computed as ldx/dul+ldy/dul, wherein x is a horizontal axis of the pixel grid, and wherein y is a vertical axis of the pixel grid.

11. The method of claim 10, wherein the scale in V direction is computed as ldx/dvl+ldy/dvl.

12. The method of claim 11, wherein the mipmap-level determining factor for the texture appearing in the scene is computed as max(0, log2(max(scale in U direction, scale in V direction))+MipBias, wherein the MipBias is determined based on an amount of desired blur.

13. The method of claim 1, wherein N, a number of frames used for displaying the snapshot, is pre-determined to avoid any potential flickering.

14. One or more computer-readable non-transitory storage media embodying software that is operable when executed to:
receive instructions to render a snapshot of a scene for a video, wherein the snapshot is to be displayed using a sequence of N frames;
compute, for a texture appearing in the scene, a mipmap-level determining factor based on a scale of the texture on a pixel grid;
select, for each of the N frames, a mipmap level of the texture based on the mipmap-level determining factor and a frame-specific factor repeating at every N frames in the video, wherein the mipmap levels selected for the N frames are non-uniform and temporally approximate the mipmap-level determining factor;
render each of the N frames by sampling the mipmap level of the texture selected for that frame; and
display the rendered N frames sequentially to represent the snapshot of the scene.

15. The media of claim 14, wherein the frame-specific factor is determined based on a position of the frame within the sequence of N frames.

16. The media of claim 15, wherein the position of the frame within the sequence of N frames is determined by taking a modulo operation on a global frame sequence number corresponding to the frame with N.

17. The media of claim 14, wherein the frame-specific factor within the sequence of N frames are distributed around zero within a range between −0.5 to +0.5.

18. A system comprising: one or more processors; and a non-transitory memory coupled to the processors comprising instructions executable by the processors, the processors operable when executing the instructions to:
receive instructions to render a snapshot of a scene for a video, wherein the snapshot is to be displayed using a sequence of N frames;
compute, for a texture appearing in the scene, a mipmap-level determining factor based on a scale of the texture on a pixel grid;
select, for each of the N frames, a mipmap level of the texture based on the mipmap-level determining factor and a frame-specific factor repeating at every N frames in the video, wherein the mipmap levels selected for the N frames are non-uniform and temporally approximate the mipmap-level determining factor;
render each of the N frames by sampling the mipmap level of the texture selected for that frame; and
display the rendered N frames sequentially to represent the snapshot of the scene.

* * * * *